US007776960B2

(12) United States Patent
Fenn et al.

(10) Patent No.: US 7,776,960 B2
(45) Date of Patent: Aug. 17, 2010

(54) EPOXY FUNCTIONAL POLYMERS COMPRISING THE REACTION PRODUCT OF TERPENE AND AN EPOXY FUNCTIONAL MONOMER AND COATINGS COMPRISING SUCH POLYMERS

(75) Inventors: David R. Fenn, Allison Park, PA (US); Simion Coca, Pittsburgh, PA (US); James O'Dwyer, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 241 days.

(21) Appl. No.: 11/564,579

(22) Filed: Nov. 29, 2006

(65) Prior Publication Data
US 2008/0125519 A1 May 29, 2008

(51) Int. Cl.
*C09D 11/10* (2006.01)
*C08K 9/00* (2006.01)
*C09F 1/00* (2006.01)

(52) U.S. Cl. .................... 525/54.4; 523/205; 526/238.3
(58) Field of Classification Search ................. 523/206, 523/205; 525/54.4; 526/238.3
See application file for complete search history.

(56) References Cited

U.S. PATENT DOCUMENTS

| 4,356,277 | A | | 10/1982 | Birkmeyer |
| 4,857,574 | A | * | 8/1989 | Buter ......................... 524/396 |
| 4,939,190 | A | * | 7/1990 | Tomioka et al. ............. 523/206 |
| 5,137,977 | A | * | 8/1992 | Saitoh et al. ................ 525/282 |
| 5,756,624 | A | | 5/1998 | Behr et al. .................. 526/309 |
| 6,420,607 | B1 | * | 7/2002 | Hamrock et al. .............. 568/32 |
| 6,787,280 | B2 | * | 9/2004 | Yamashita et al. ........ 430/111.4 |
| 7,608,676 | B2 | | 10/2009 | Fenn et al. |
| 2004/0138365 | A1 | * | 7/2004 | Gasper et al. ............... 524/431 |
| 2004/0175407 | A1 | * | 9/2004 | McDaniel .................... 424/423 |
| 2005/0082169 | A1 | * | 4/2005 | Katsuta et al. .............. 204/505 |

FOREIGN PATENT DOCUMENTS

| DE | 1236794 | | 3/1967 |
| EP | 0127813 | | 12/1984 |
| JP | 09040760 | A * | 2/1997 |
| JP | 09110847 | | 4/1997 |
| JP | 10110007 | | 4/1998 |
| JP | 11241003 | | 9/1999 |
| JP | 2000169760 | | 6/2000 |
| JP | 08003513 | | 1/2005 |
| JP | 2005037738 | | 2/2005 |

OTHER PUBLICATIONS

Machine translation of JP 09-040760 (printed Aug. 26, 2009).*
Utilization of turpentine in epoxy resin by Rong Won and Zhanqian Song; *Reguxing Shuzhi* (1997), 12 (1), 29-32 (English Abstract).
U.S. Appl. No. 11/564,570 filed Nov. 29, 2006, entitled: "Coatings Comprising Terpene".

* cited by examiner

*Primary Examiner*—Mark Eashoo
*Assistant Examiner*—Megan McCulley
(74) *Attorney, Agent, or Firm*—Diane R. Meyers

(57) ABSTRACT

Epoxy functional polymers comprising the reaction product of a terpene and a epoxy functional monomer are disclosed. Coatings comprising these polymers are also disclosed, including cationic electrodepositable coatings.

21 Claims, No Drawings

EPOXY FUNCTIONAL POLYMERS COMPRISING THE REACTION PRODUCT OF TERPENE AND AN EPOXY FUNCTIONAL MONOMER AND COATINGS COMPRISING SUCH POLYMERS

FIELD OF THE INVENTION

The present invention relates generally to epoxy functional polymers and coatings comprising such polymers.

BACKGROUND OF THE INVENTION

The price of raw materials used in many manufacturing processes continue to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to an epoxy functional polymer comprising the reaction product of a terpene and an epoxy functional monomer.

The present invention is further directed to a coating comprising an epoxy functional polymer comprising the reaction product of a terpene and an epoxy functional monomer.

DETAILED DESCRIPTION OF THE INVENTION

The present invention is directed to an epoxy functional polymer comprising the reaction product of a terpene and an epoxy functional monomer. This polymer is sometimes referred to herein as the "terpene/epoxy functional" polymer.

Terpene, as used herein, includes α-pinene, β-pinene, terpinolene, limonene (dipentene), β-terpinene, γ-terpinene, α-thujene, sabinene, δ-$^3$-carene, camphene, β-cadinene, β-caryophyllene, cedrene, α-bisalbone, β-bisalbone, γ-bisalbone, zingiberene, humulene, (α-caryophyl-1-ene), α-citronellol, linalool, geraniol, nerol, ipsenol, α-terpineol, D-terpineol-(4), dihydrocarveol, nerolidol, farnesol, α-eudesmol, β-eudesmol, citral, D-citronellal, carvone, D-pulegone, piperitone, carvenone, bisabolene, β-selinene, α-santalene, vitamin A, abietic acid and mixtures of these compounds.

The monomer comprising epoxy functionality can include, for example, monomers comprising glycidyl groups such as glycidyl (meth)acrylates. It will be appreciated that these monomers contain at least one functional group in addition to the epoxy functionality. It is this functionality that reacts with the terpene to form the polymer of the present invention. Thus, the resulting polymer is epoxy functional. "Epoxy functional", and like terms, as used herein refer to a compound, polymer or monomer having at least one unreacted epoxy group. This epoxy group can undergo reaction with, for example, an amine to form a group from which a cationic salt can be derived or with an acid to form an ester. In this manner, the epoxy functional polymer of the present invention can be crosslinked or can otherwise form at least a portion of a coating.

The terpene and epoxy functional monomer can be polymerized by any method known in the art such as free radical polymerization. In free radical polymerization, the terpene and monomer comprising epoxy functionality are generally mixed together in the presence of a free radical polymerization initiator. Any standard free radical polymerization method can be used. In certain embodiments, a continuous process for making the polymer at high temperature (i.e. greater than 160° C.) and high pressure (i.e. greater than 500 psi) using low amounts of initiator (i.e. less than 10 wt %) are used. In certain embodiments, the polymerization is carried out in the substantial absence of Lewis acids and transition metals.

Any suitable free radical polymerization initiator may be used in the present invention. Suitable free radical initiators are typically thermal free radical initiators. Suitable thermal free radical initiators include, but are not limited to, peroxide compounds, azo compounds and persulfate compounds.

Examples of suitable thermal free radical initiator peroxide compounds include, but are not limited to, hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

Examples of suitable thermal free radical initiator azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride, 2-(carbamoylazo)-isobutyronitrile and mixtures thereof.

The present polymers can also be prepared by grafting terpene onto an epoxy functional monomer, or by functionalizing terpene and then converting the functionality to epoxy.

The polymers of the present invention can be random polymers, graft polymers, block polymers, alternating polymers and the like, prepared as described above or by any other means known in the art.

Typically, the terpene can comprise 10 to 60 wt %, such as 30 to 50 wt % of the total solids weight of the polymer. The epoxy functional monomer can comprise 5 to 40 wt %, such as 10 to 30 wt % of the polymer. It will be appreciated that although reference is made throughout this specification and claims to "a" terpene and "an" epoxy functional monomer, mixtures of terpenes and/or such monomers can be used. In addition, any other monomers can also be used. When other monomers are used, they can be present in amounts ranging from 85 to 10 wt %, such as 75 to 25 wt %, based on total solids weight of the copolymer. Thus, the terpene/epoxy function polymers of the present invention can further comprise any number of other monomers, even if these polymers may be referred to herein as "co"polymers.

The present invention is further directed to a coating comprising a terpene/epoxy functional polymer of the present invention. A "coating" according to the present invention will generally be understood as a composition that, when cured, can form a substantially continuous film or layer. In certain embodiments, the coating according to the present invention is not an adhesive, which, when cured, has a tacky or sticky feel. The coatings of the present invention can comprise 5 to 100 wt %, such as 10 to 70 or 10 to 40 wt %, based on total solids weight, of the terpene/epoxy functional polymer. When these polymers are used in a coating, the coating may comprise 10 wt % or greater terpene, such as 20 wt % or greater, or 30 wt % or greater, with wt % based on total solids weight.

It will be appreciated that when the present terpene/epoxy functional polymers are used in a coating according to the present invention, they can form part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or, alternatively, may be in solid particulate form, i.e., a powder coating.

Thermosetting or curable coating compositions typically comprise film forming polymers or resins having functional groups that are reactive with either themselves or a crosslinking agent. The film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

Appropriate mixtures of film-forming resins may also be used in the preparation of the coating compositions.

The thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

In certain embodiments, the present coatings are electrodepositable. In these embodiments, the epoxy functionality on the present polymers can be converted to a cationic salt. Cationic salt groups can be introduced by the reaction of the epoxy group with appropriate salt forming compounds. For example, sulfonium salt groups can be introduced by reacting a sulfide in the presence of an acid, as described in U.S. Pat. Nos. 3,959,106 and 4,715,898, incorporated by reference herein; amine salt groups can be derived from the reaction of an epoxy group with a compound containing a primary or secondary amine group, such as methylamine, diethanolamine, ammonia, diisopropanolamine, N-methyl ethanolamine, diethylentriamine, dipropylenetriamine, bishexamethylenetriamine, the diketimine of diethylentriamine, the diketimine of dipropylenetriamine, the diketimine of bishexamethylenetriamine and mixtures thereof. The amine groups can be at least partially neutralized with an acid. Suitable acids include organic and inorganic acids such as formic acid, acetic acid, lactic acid, phosphoric acid, dimethylolpropionic acid and sulfamic acid. Mixtures of acids can be used. The resin can contain primary, secondary and/or tertiary amino groups.

It will be appreciated that in formulating an electrodepositable coating compositions according to the present invention, the resin described above can be dispersed in a dispersing medium. The dispersing medium can be water. The dispersion step may be accomplished by combining the neutralized or partially neutralized reaction product with the dispersing medium. Neutralization and dispersion can be accomplished in one step by combining the resin and the dispersing medium. The reaction product can be added to the dispersing medium or the dispersing medium can added to the resin (or its salt). In certain embodiments, the pH of the dispersion is within the range of 4 to 9. The dispersion can be formed at a suitable solids level for the final coating, for example 5 to 15 weight percent, or it can be formed at a higher solids, for example 20 to 45 weight percent, to minimize the weight and volume of material that needs to be stored and transported. The dispersion can then be adjusted to a suitable solids level for coating prior to use. Alternatively the resin, optionally blended with the crosslinker, can be stored and transported as an organic solution and dispersed shortly before use. Suitable conditions for forming such stable dispersions include those set forth in the Examples.

The cationic salt containing resin according to the present invention can then be used in an ecoat like any other cationic salt known in the art. Thus, the present invention is further directed to a cationic electrodepositable coating wherein the coating comprises an epoxy functional polymer comprising the reaction product of a terpene and an epoxy functional monomer. It will be appreciated by those skilled in the art that the epoxy functionality will react, such that it will not be present in the cured coating. The ecoat can comprise 10 to 90 wt %, such as 10 to 60 wt % of the terpene/epoxy functional polymer, wherein wt % is based here on the total weight of the resin. In certain embodiments, the ecoat can further comprise one or more other resins commonly used in electrodepositable coatings. Examples include a cationic acrylic resin, such as one derived from an epoxy functional acrylic resin.

The coating compositions may also include a solvent. Suitable solvents include water, organic solvent(s) and/or mixtures thereof. Suitable solvents include glycols, glycol ether alcohols, alcohols, ketones, and aromatics, such as xylene and toluene, acetates, mineral spirits, naphthas and/or mixtures thereof. "Acetates" include the glycol ether acetates. In certain embodiments, the solvent is a non-aqueous solvent. "Non-aqueous solvent" and like terms means that less than 50 percent of the solvent is water. For example, less than 10 percent, or even less than 5 percent of the solvent can be water. It will be understood that mixtures of solvents, including or excluding water in an amount of less than 50 percent, can constitute a "non-aqueous solvent".

If desired, the coating compositions can comprise other optional materials well known in the art of formulating coatings, such as plasticizers, anti-oxidants, hindered amine light stabilizers, UV light absorbers and stabilizers, surfactants, flow control agents, thixotropic agents, colorants, fillers, organic cosolvents, reactive diluents, catalysts, grind vehicles, and other customary auxiliaries.

The coatings of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

It will be further appreciated that the coatings described herein can be either "one component" ("1K") or "two component" ("2K"), or even multi-component compositions. A 1K composition will be understood as referring to a composition wherein all of the coating components are maintained in the same container after manufacture, storage, etc. A 1K coating can be applied to a substrate and cured by any conventional means, such as by heating, forced air, and the like. The present coatings can also be 2K coatings, which will be understood as coatings in which various components are maintained separately until just prior to application.

As stated above, in certain embodiments, the polymer of the present invention can react with, and become part of the film-forming resin of the coating.

The present coatings can be applied to any substrates known in the art for example automotive substrates and industrial substrates. These substrates can be, for example, metallic, polymeric, transparent plastic substrates, polycarbonate, wood substrates, concrete, glass and the like.

The coatings of the present invention can be applied by any means standard in the art such as electrocoating, spraying, electrostatic spraying, dipping, rolling, brushing, and the like.

The coatings can be applied to a dry film thickness of 0.1 to 5.0 mils, such as 0.5 to 3.0 or 0.9 to 2.0 mils. The coatings of the present invention can be used alone, or in combination with other coatings. For example, the coatings can be pigmented or unpigmented, and can be used as a primer, e-coat, base coat, top coat, automotive repair coat and the like. For substrates coated with multiple coatings, one or more of those coatings can be coatings as described herein.

In certain embodiments, the coating further comprises a urea, wherein the urea is formed from a reaction mixture comprising an isocyanate-functional component and an amine-functional component, wherein the ratio of equivalents of isocyanate groups to equivalents of amine groups is greater than 1 and the isocyanate-functional component and the amine-functional component can be applied to a substrate at a volume mixing ratio of 1:1.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein to "a" terpene, "an" epoxy functional monomer, "a" terpene/epoxy functional polymer and the like, one or more of each of these and any other components can be used. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

|  | Ingredients | Parts by weight (grams) |
|---|---|---|
| Charge A | β-pinene | 246.0 |
| Charge B | 4-hydroxybutyl acrylate | 75.0 |
|  | glycidyl methacrylate | 72.0 |
|  | methyl acrylate | 162.0 |
|  | hydroxypropyl acrylate | 43.2 |
|  | acrylic acid | 1.8 |
| Charge C | Di-tert.-butyl peroxide | 42.0 |

Charge A was added to a 1-liter stirred stainless steel pressure reactor. The reactor was then pressured with nitrogen and held at 5 psig. The agitation on the reactor was set at 500 rpms and the reactor temperature was adjusted to 185° C. Charges B and C were then added to the reactor concurrently over 20 minutes. During the monomer addition, the pressure was maintained at 170 PSI. After Charge 2 and 3 were in the reactor, the reaction mixture was held for 20 minutes. The reactor was then cooled to 25° C. The reaction product had a number average molecular weight of 2194 and a weight average molecular weight of 10402 (determined by gel permeation chromatography in THF using polystyrene as a standard).

Example 2

|  | Ingredients | Parts by weight (grams) |
|---|---|---|
| Charge A | 06-089-126 | 576.8 |
|  | DOWANOL PM[1] | 48.4 |
| Charge B | thiodiethanol | 105.3 |
|  | PURAC HS 50[2] | 54.3 |
|  | 12-hydroxystearic acid | 13.0 |
|  | deionized water | 23.3 |
| Charge C | DOWANOL PM | 27.4 |
|  | DOWANOL PPh[3] | 62.8 |
|  | plasticizer[4] | 10.9 |
| Charge D | VESTANAT B-1358-100[5] | 435.8 |
| Charge E | DOWANOL PM | 5.0 |
|  | dibutyltin diacetate | 5.0 |
| Charge F | Cationic epoxy resin 1[6] | 208.9 |
|  | deionized water | 948.8 |
| Charge G | deionized water | 727.1 |

[1]1-methoxy-2-propanol available from Dow Chemical Co.
[2]50% aqueous lactic acid available from Purac America Inc.
[3]propyleneglycol monophenyl ether available from Dow Chemical Co.
[4]Reaction product of paraformaldehyde (9% by weight) and diethylene glycol monobutyl ether (91% by weight) prepared as described in EP 339 795.
[5]Oxime blocked IPDI isocyanurate trimer, available from Degussa AG.
[6]Prepared as described in US Pat No 4 715 898 example 4, except that the propylene glycol monobutyl ether was replaced with a 4:1 by weight mixture of propylene glycol butyl ether and propylene glycol methyl ether and that sufficient deionized water was added to reduce the solids content to 30.6%.

Components A were charged to a flask fitted with a nitrogen inlet, stirrer, condenser and thermocouple. The temperature was increased to 120° C., the heat source was removed and the thiodiethanol from charge B was added. Once the temperature was below 100° C. the remainder of charge B was added. The heat source was then replaced and the temperature was adjusted to 85° C. This temperature was maintained for 3½ hours. Charge D was then added and the temperature raised back to 85° C. Once a homogeneous solution of resin and crosslinker had been achieved, charge E was then added and stirring was continued for a further 20 minutes.

In a separate vessel, charge F was heated to 40° C. The resin and crosslinker solution was then added under rapid agitation. One hour later, charge G was added. The resin dispersion was allowed to cool to below 30° C. before stirring was stopped. The resulting dispersion had a solids content of 31.4% and a weight average molecular weight of 10762 (determined by gel permeation chromatography in DMF using polystyrene as a standard)

Example 3

This example describes the preparation of an electrodeposition bath composition of the present invention and the coating and testing of panels. The electrodeposition bath was prepared from a mixture of the following ingredients:

| INGREDIENTS | PARTS BY WEIGHT (grams) |
|---|---|
| resin of Example 2 | 1146.5 |
| Solvent blend[7] | 72.0 |
| deionized water | 1181.5 |

[7]50 parts ethylene glycol monohexyl ether, 25 parts ethylene glycol monobutyl ether, and 25 parts diethylene glycol monobutyl ether.

The paint was made by adding the solvent to the resin under agitation. The blend was then reduced with all of the deionized water. The bath remained under agitation for 16 to 24 hours prior to panel coat out.

The bath composition was electrodeposited onto aluminum 3003H14, milled finish alloy. Conditions for cationic electrodeposition were 30 seconds at 80° F. at 100 volts DC to yield a cured dry film thickness of approximately 0.80 mils. The electrocoated substrate was cured in an electric oven at 320° F. for 30 minutes. The electrocoated panels were tested and the results are recorded in the table below.

|  | Paint of Example 3 |
|---|---|
| Pencil Hardness* | 2H |
| Solvent Resistance** | 10 |
| Perspiration resistance*** | 10 cycles |

*Pencil Hardness tested in triplicate according to ASTM D3363-92a. Result recorded is the softest pencil which does not scratch or mar the coated surface. The scale, from softest to hardest, is 6B-5B-4B-3B-2B-B-HB-F-H-2H-3H-4H-5H-6H.
**100 double rubs with acetone. A rating of 10 indicates no mar or burnishing of the coated surface.
***Perspiration resistance test as described in ANSI/BHMA A156.18-2000, American National Standard for Materials and Finishes, available from the American National Standard Institute, New York.

Whereas particular embodiments of this invention have been described above for purposes of illustration, it will be evident to those skilled in the art that numerous variations of the details of the present invention may be made without departing from the invention as defined in the appended claims.

Therefore we claim:

1. An epoxy functional polymer comprising the reaction product of a terpene and an epoxy functional monomer wherein the terpene comprises 10 to 60 weight % of the total solids weight of the polymer.

2. The polymer of claim 1, wherein the terpene comprises α-pinene.

3. The polymer of claim 1, wherein the terpene comprises β-pinene.

4. The polymer of claim 1, wherein the terpene comprises limonene.

5. The polymer of claim 1, wherein the terpene comprises turpentine.

6. The polymer of claim 1, wherein the epoxy functionality is introduced by reaction of the terpene and glycidyl methacrylate.

7. A coating comprising the polymer of claim 1.

8. The coating of claim 7, wherein the polymer comprises part of a film-forming resin of the coating.

9. The coating of claim 7, wherein the polymer comprises 10 to 60 wt % of the coating, based on total solids weight.

10. The coating of claim 7, wherein the coating comprises a colorant.

11. The coating of claim 7, wherein the coating is substantially clear.

12. The coating of claim 7, wherein the coating is a two component coating, and the polymer is in one component and a curing agent is in another component.

13. The coating of claim 7, wherein the coating further comprises a polyurea, wherein the polyurea is formed from a reaction mixture comprising an isocyanate-functional component and an amine-functional component, wherein the ratio of equivalents of isocyanate groups to equivalents of amine groups is greater than 1 and the isocyanate-functional component and the amine-functional component can be applied to a substrate at a volume mixing ratio of 1:1.

14. The coating of claim 7, wherein the epoxy functionality is introduced by reaction of terpene and glycidyl methacrylate.

15. The coating of claim 7, wherein the terpene comprises turpentine.

16. The coating of claim 7, wherein the terpene comprises β-pinene.

17. The polymer of claim 1, wherein the terpene comprises 30 to 50 weight % of the total solids weight of the polymer.

18. A cationic, electrodepositable coating wherein the coating comprises a polymer comprising the reaction product of a terpene and an epoxy functional monomer, wherein epoxy functionality on the polymer has been converted to a cationic salt.

19. The electrodepositable coating of claim 18, wherein the polymer comprises 10 to 60 wt % of the coating, based on total solids weight.

20. The electrodepositable coating of claim 18, wherein the terpene comprises turpentine.

21. The electrodepositable coating of claim 18, wherein the terpene comprises β-pinene.

* * * * *